United States Patent [19]

Mugrauer et al.

[11] Patent Number: 4,711,564

[45] Date of Patent: Dec. 8, 1987

[54] MECHANISM FOR THE DRIVE OF ACTUATION ELEMENTS MOVABLE IN SEALED REGIONS OF NON-MECHANICAL PRINTER OR COPIER MEANS

[75] Inventors: Hubert Mugrauer, Poering; Ernst Puritscher, Unterhaching; Franz Wittmann, Isen, all of Fed. Rep. of Germany

[73] Assignee: Siemens Aktiengesellschaft, Berlin and Munich, Fed. Rep. of Germany

[21] Appl. No.: 937,490

[22] Filed: Dec. 3, 1986

[30] Foreign Application Priority Data

Dec. 3, 1985 [DE] Fed. Rep. of Germany ....... 3542733

[51] Int. Cl.[4] ............................................. G03B 27/52

[52] U.S. Cl. ....................................... 355/30; 355/15; 15/256.52

[58] Field of Search .................. 355/15, 30; 15/256.52

[56] References Cited

U.S. PATENT DOCUMENTS 3,842,273 10/1974 Van Buskirk ...................... 250/324

3,965,400 6/1976 Tolliver .......................... 317/262 A 4,142,269 3/1979 Seeberger ........................ 15/256.52

*Primary Examiner*—Peter S. Wong

*Assistant Examiner*—Marc S. Hoff

*Attorney, Agent, or Firm*—Hill, Van Santen, Steadman & Simpson

[57] ABSTRACT

In the cleaning station of an electrophotographic printer, the stripper element is driven with the assistance of a cable roller arranged outside of a stripping chamber. The cable roller arranged in alignment with the through openings for the traction cable comprises guide grooves for the traction cable on its generated surface, these guide grooves proceeding left-hand or right-hand in a plurality of spirals or turns. Via a thread, the cable roller is arranged on a stationary rotational axis which has the same characteristic as the guide grooves in terms of direction and pitch or slope. As a result thereof, the traction cable is conducted on a straight line through the seals of the stripping chamber at a constant angle given movement of the cable roller.

11 Claims, 2 Drawing Figures

MECHANISM FOR THE DRIVE OF ACTUATION ELEMENTS MOVABLE IN SEALED REGIONS OF NON-MECHANICAL PRINTER OR COPIER MEANS

BACKGROUND OF THE INVENTION

1. Field of the Invention

The present invention relates to a mechanism for the drive of actuation elements which are movable in sealed regions of a non-mechanical printer or copier means.

2. Description of the Prior Art

A cleaning means for an intermediate carrier in a printer or copier means functioning based on the electrophotographic principle is disclosed, for example, by German patent No. 27 06 599. The cleaning means is composed of a brush, of an exhaust hood and a stripping chamber and of a slide running in the stripping chamber. The slide is secured to a cable. One section of this cable runs in the stripping chamber and emerges from the stripping chamber at the respective broad sides thereof, sealed by seals. Two rollers are arranged outside of the stripping chamber via which the cable runs. The other section of the cable proceeds outside of the stripping chamber. A cable pulley receiving the cable is driven by a motor.

Similar cleaning devices for cleaning a corona wire in a corona generator are also disclosed, for example, by German OS No. 24 24 865.

A significant problem given such cleaning devices is sealing the region containing the toner, whereby the risk is present that toner will remain adhering to the traction cable of the actuation element and will thus penetrate toward the outside. In order to reduce this risk, smooth and round traction cables are usually employed in such devices, these enabling an easier sealing of the regions containing the toner. Such round and smooth cables, however, easily slip on cable rollers, this in turn having a negative influence on the positioning precision of the cable-moved actuation element in the sealed region.

SUMMARY OF THE INVENTION

An object of the invention is to provide a mechanism of the type initially described such that, first, the actuation element can be reliably positioned and, second, such that the traction cable can be conducted through the sealed regions in anti-leak fashion.

In accord with the invention, the cable roller includes guide rollers for the traction cable on its generated surface, these guide rollers proceeding left-hand or right-hand in a plurality of spirals or turns. Via a thread, the cable roller is arranged on a stationary rotational axis, whereby the thread on the rotational axis has the same characteristic in the direction of pitch as the guide rollers. As a result thereof, the traction cable is conducted on a straight line at a constant angle through seals of the sealed region during the motion of the cable roller. During the winding and unwinding process of the traction cable on the cable roller, no offset of the cable at the seals can occur, for which reason the cable can be conducted through the seals in leak-free fashion. The multiple wrapping of the generated surface prevents the cable from sliding through on the generated surface.

It is also additionally possible to fix the cable to the generated surface of the cable roller with the assistance of a clamp means.

The guide rollers on the generated surface of the cable roller conduct the traction cable such that the traction cable remains in the guide grooves during winding and unwinding of the cable on the cable roller and does not place itself in turns on top of one another. The actuation element connected to the traction cable is thus positioned in reliable and reproducible fashion.

The employment of a plastic-clad steel cable enables an especially leak-proof passage of the cable through the seals. The cable roller itself can be manufactured of thermoplastic synthetic.

In order to increase the acceptance capacity of the cable roller, the cable roller can be arranged at an oblique angle relative to the moving direction of the traction cable.

When the mechanism is employed in a cleaning station in printer or copier means wherein toner dust is situated in the sealed regions, then scraper elements engaging into the guide grooves of the cable roller can be provided for self-cleaning of the cable roller. The scraper elements keep the guide grooves of the cable roller free of toner dust which may potentially adhere to the cable. A change in the diameter of the generated surface due to the toner dust is thus prevented.

BRIEF DESCRIPTION OF THE DRAWINGS

An embodiment of the invention is shown in the drawings and shall be set forth in greater detail below by way of example. Shown therein are.

DESCRIPTION OF THE PREFERRED EMBODIMENTS

Figures 1, 2:
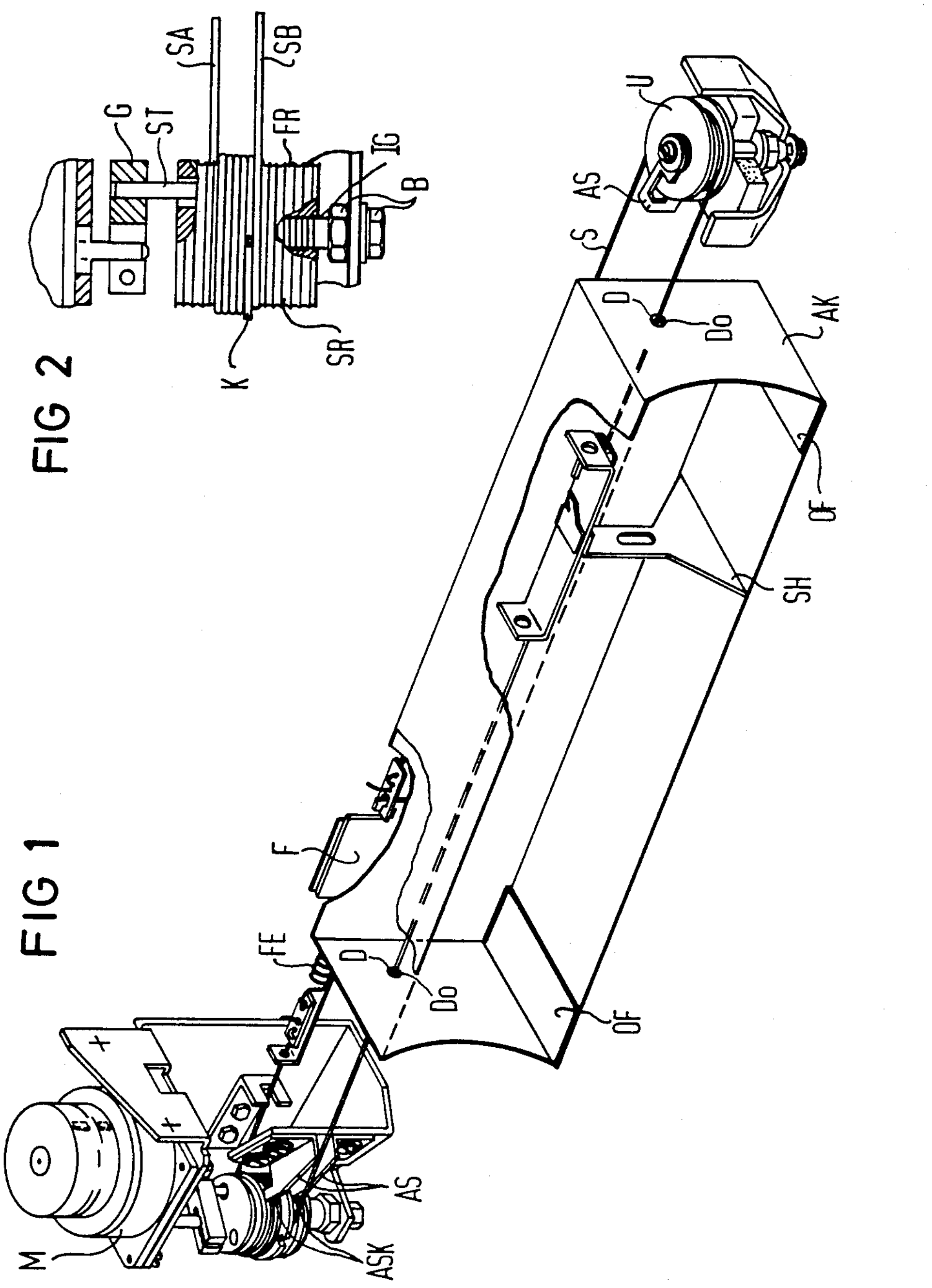
FIG. 1 is a schematic illustration of a cleaning device for an intermediate carrier in a non-mechanical printer means with corresponding drive device.
FIG. 2 is a schematic illustration of the cable roller shown partially in a section view.

A cleaning device for an intermediate carrier in a printer or copier means functioning according to the electrostatic principle as disclosed, for example, in principle by German patent No. 27 06 599 and contains a stripping chamber AK open at one side into whose open side a cleaning brush (not shown here) for a photoconductor drum of the printer means projects. The cleaning brush serves the purpose of removing the toner from the photoconductor drum of the printer and of depositing it in the stripping chamber AK. To this end, a slide SH which can be moved back and forth via a cable S is situated in the stripping chamber AK and supplies the toner residues deposited in the stripping chamber AK to exhaust openings OF. The stripping chamber AK must thereby be closed in an absolutely toner-tight fashion so that no toner dust will penetrate into the surrounding drive region. To this end, the through openings DO for the cable S in the region of the stripping chamber AK are provided with double seals D which surround the plastic-clad steel cable S nearly dust-tight. The cable S is wound onto a generated surface of a motor-driven cable roller SR. A deflection roller U serves as cooperating support mount, this deflecting the cable emerging from the stripping chamber AK and returning it to the generated surface of the cable roller SR behind the stripping chamber. A sensor element F which, for example, is composed of a magnet is situated on a part of the cable S which remains outside of the stripping chamber AK, this sensor element F controlling a switch (not shown) for a drive motor M. The function of such switches in conjunction with the drive motor is set forth in detail in German patent No. 27 06 599. Via a gearing G, the drive motor M engages into the cable roller SR via a pin ST. The cable roller is rotatably arranged on a threaded pin B, whereby the threaded pin B is firmly secured to a clip of the printer frame.

In order to receive the cable S, the cable roller includes guide grooves FR which proceed left-hand in the illustrated example. The thread of the threaded pin B or, respectively, the inside thread IG of the cable roller SR cooperating with the threaded pin B comprises the same characteristic of direction and pitch as the guide grooves. The cable itself is firmly but releasably connected at one location to the cable roller SR composed of thermoplastic synthetic, being connected thereto via a clamp member K.

Given actuation of the motor M in order, for example, to move the slide from the illustrated position toward the left, the one cable section SA which is connected to the sensor element F unwinds from the cable roller SR and the other cable section SB which is with the slide SH winds up on the cable roller, namely exactly in the guide grooves FR. When winding up the cable section SB, the cable roller SR is moved upwardly away by means of this motion as a consequence of the inside thread IG of the threaded pin B, whereby the thread slope and the circumference of the cable roller SR are matched such that the cable S always proceeds through the through opening DO of the stripping chamber AK on a straight line. As a consequence, no angular offset of the cable between the cable roller SR and the through opening DO of the cable section SB can occur. What results therefrom is a completely tight closure of the stripping chamber AK by the seal D. Further, the cable and, thus, the slide SH can be positioned very exactly by means of the guide grooves FR. Toner which may nonetheless be potentially adhering to the cable and which could deposit in the guide grooves is removed with the assistance of two scraper blades AS whose tips ASK engage into the guide grooves. Such a scraper blade AS is also situated in the region of the deflection roller U. The reciprocating motion is controlled in a fashion not shown here in detail in that the sensor element F activates two switches which define the stop position of the slide SH, these switches being connected to the motor M. In order to keep the cable taut, a spring element FE is arranged between the sensor element F and the one section of the cable S.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

We claim as our invention:

1. A mechanism for the drive of actuation elements movable in sealed regions of a printer or copier means with the assistance of a motor-driven cable roller arranged outside of a sealed region wrapper via a traction cable secured to said actuation element, comprising the improvement that said cable roller includes guide grooves on its generated surface for said traction cable, said guide grooves proceeding in a spiral, said cable roller being arranged on a stationary rotational axis via a thread, said rotational axis thread having the same characteristic as said guide grooves in terms of direction and pitch, whereby during the movement of said cable roller, said traction cable is conducted through seals of said sealed region at a relatively constant angle on a substantially straight line.

2. A mechanism according to claim 1, wherein said motor engages into said cable roller via a dog pin.

3. A mechanism according to claim 1, wherein said cable roller is composed of thermoplastic synthetic.

4. A mechanism according to claim 3, wherein said traction cable is composed of plastic-clad steel.

5. A mechanism according to claim 1, wherein said traction cable is fixed to the generated surface of said cable roller via a clamp element.

6. A mechanism according to claim 1, wherein for increasing the acceptance capacity of said cable roller, said cable roller is arranged at an oblique angle relative to the moving direction of said traction cable.

7. A mechanism according to claim 1, wherein scraper elements engaging into said guide grooves are provided for self-cleaning of said cable roller.

8. A mechanism for the drive of actuation elements movable in sealed regions of a printer or copier means with the assistance of a motor-driven cable roller arranged outside of a sealed region wrapper via a traction cable secured to said actuation element, comprising the improvement that said cable roller is composed of a thermoplastic synthetic and includes guide grooves on its generated surface for said traction cable, which is composed of plastic-clad steel, said guide grooves proceeding in a spiral, said cable roller being arranged on a stationary rotational axis via a thread, said rotational axis thread having the same characteristic as said guide grooves in terms of direction and pitch, and said traction cable being fixed to the generated surface of said cable roller via a clamp element, whereby during the movement of said cable roller, said traction cable is conducted through seals of said sealed region at a relatively constant angle on a substantially straight line.

9. A mechanism according to claim 8, wherein said motor engages into said cable roller via a dog pin.

10. A mechanism according to claim 8, wherein for increasing the acceptance capacity of said cable roller, said cable roller is arranged at an oblique angle relative to the moving direction of said traction cable.

11. A mechanism according to claim 8, wherein scraper elements engaging into said guide grooves are provided for self-cleaning of said cable roller.

* * * * *